A. C. ROEBUCK.
KINETOSCOPE.
APPLICATION FILED AUG. 13, 1906.
955,477.
Patented Apr. 19, 1910.
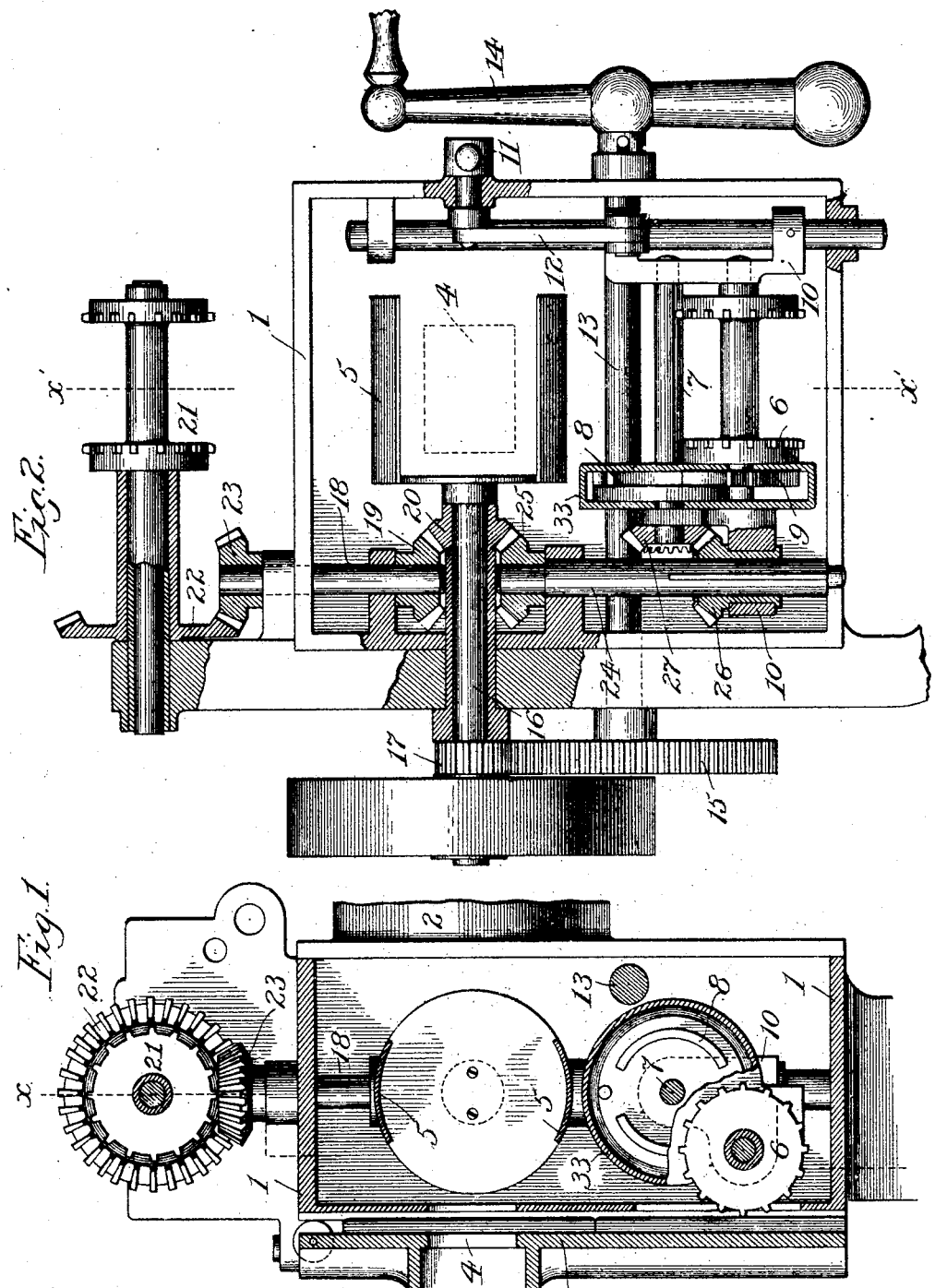
Attest:
Henry Moe
Chas. H. Buell.
Inventor:
Alvah C. Roebuck.
by Robert Burns
Attorneys

UNITED STATES PATENT OFFICE.

ALVAH C. ROEBUCK, OF CHICAGO, ILLINOIS.

KINETOSCOPE.

955,477.  Specification of Letters Patent.  Patented Apr. 19, 1910.

Application filed August 13, 1906. Serial No. 330,301.

*To all whom it may concern:*

Be it known that I, ALVAH C. ROEBUCK, a citizen of the United States of America, and a resident of Chicago, in the county of Cook and State of Illinois, have invented certain new and useful Improvements in Kinetoscopes, of which the following is a specification.

This invention relates to that type of kinetoscopes in which a pictured band film is intermittently fed through the apparatus, and has for its object to provide a simple and effective structural arrangement and combination of parts whereby the series of pictures on the film can be adjusted in relation to the light orifice or passage of the apparatus to effect a ready and accurate framing of said pictures without any interference with or disturbance in the normal relations of the other mechanisms of the apparatus, all as will hereinafter more fully appear.

In the accompanying drawings:—Figure 1 is a longitudinal sectional elevation on line $x$—$x$, Fig. 2 of a kinetoscope having the present improvement applied. Fig. 2 is a transverse sectional elevation on line $x'$—$x'$ Fig. 1 of the same.

Similar numerals of reference indicate like parts in the different views.

Referring to the drawings, 1 is the main frame or housing of the kinetoscope preferably of the closed rectangular form shown, and provided at one end with the usual objective 2, and at the opposite end with a horizontally swinging door 3, for convenience in inserting and removing the picture film, as usual in the present type of kinetoscopes.

4 is the light passage of the apparatus, formed by the usual alined openings or orifices in the housing 1 and door 3, as shown.

5 is the light controlling shutter, of any usual construction, and preferably of the barrel type shown; such shutter is arranged within the housing 1, across the path of the light passage 4 aforesaid, and is adapted to alternately open and close said light passage in the normal operation of the apparatus.

6 is the film feeding sprocket drum arranged transversely in the housing 1 in adjacent relation to the shutter 5, aforesaid; such sprocket drum receives intermittent rotation, in unison with the constant rotation of the light controlling shutter, through the hereinafter described connecting gearing between said parts and so that the film will be left stationary during the full period in which the shutter remains open, and will have its feed pass the light passage of the kinetoscope when the shutter is closed, as usual in the present type of apparatus.

7 is a countershaft journaled in fixed relation to the sprocket drum 6 on a common carriage, as hereinafter more fully described; such countershaft carries the driving member of the intermediate pair of gears 8 and 9 by which the continuous rotation of the shaft 7 imparts the intermittent rotation to the film feeding sprocket drum 6, above referred to, and such intermediate gearing will be of the Geneva or other equivalent type usually employed in the present form of apparatus.

In the present invention the light-controlling shutter 5 has its pivot or journal axis on a fixed plane in the main housing 1, in order to maintain a fixed relation to the light passage 4, while the film feeding sprocket drum 6 and the countershaft 7 are made adjustable to and from said shutter and light passage for the purpose of affording an independent adjustment of the sprocket drum, and the picture film in engagement therewith, in relation to said shutter and light passage. And in this connection a material part of the invention consists in the provision of an intermediate operating connection between the main driving shaft of the apparatus and the sprocket drum 6 and driving countershaft 7, whereby the aforesaid independent adjustment of the sprocket drum, and the film in engagement therewith, in relation to the light passage and shutter can be obtained without any circular disturbance in the normal relation of said shutter to the light passage 4 and other coacting mechanisms of the apparatus. And the scope of this part of the invention embraces the use of any ordinary form of intermediate gearing connection between the sprocket drum and the main driving shaft and between the shutter and the main driving shaft which permits of a bodily adjustment of the sprocket drum without imparting any circular displacement to either the sprocket drum or to the shutter.

In the preferred form of intermediate gearing shown in Figs. 1 and 2 for attaining the functions above set forth, a construction and arrangement of parts is employed as follows:—

10 is an adjustable frame or carriage having a sliding movement on suitable guideways in the main housing 1, and provided with journal bearings for the support of the film feeding sprocket drum 6, and countershaft 7, before described.

11 is a hand lever journaled in the main housing 1, and having link connection 12 with the carriage 10 to afford means for the convenient manual adjustment of said carriage.

13 is the main driving shaft of the apparatus, arranged in a transverse direction in the housing 1, and provided at one end with an operating handle 14, and at the other end with a spur gear 15, as shown.

16 is the shutter carrying shaft, journaled in the housing 1 and provided with a pinion 17 meshing with the spur gear 15, to receive motion therefrom.

18 is a shaft journaled in the housing 1, in angular relation to the shutter shaft, and provided at its lower end with a bevel pinion 19 which meshes with and receives motion from a bevel pinion 20 carried by the shutter shaft aforesaid.

21 is a "pull off" sprocket drum usual to the present type of apparatus and carrying a bevel gear 22 which meshes with and receives motion from a bevel pinion 23, carried on the upper end of the shaft 18, aforesaid.

24 is a shaft journaled in the housing 1 in angular relation to the aforesaid shutter shaft, and provided at its upper end with bevel pinion 25 which meshes with and receives motion from the bevel pinion 20, carried by the shutter shaft aforesaid.

26 is a bevel pinion journaled in the frame or carriage 10, before described, and having rotative engagement with the vertical shaft 24, by a spline and groove or other equivalent non-circular connection, which permits of a longitudinal movement of the bevel gear upon said shaft, and at the same time imposes rotative engagement between the parts.

27 is a bevel pinion mounted on the countershaft 7 of the film feeding mechanism before described; and said pinion 27 meshes with and is driven by the bevel pinion 26, in the operation of the apparatus.

With the arrangement of parts above described, the carriage 10, carrying the film feeding mechanism, is capable of adjustment to and from the shutter to properly frame the pictures on the film without any disturbance in the circular relation of the parts.

33 is a closed casing or housing surrounding the intermittent gearing by which the film feeding sprocket drum is driven, and which is adapted to deaden the objectionable noise produced by such gearing in the operation of the apparatus.

Having thus fully described my said invention, what I claim as new and desire to secure by Letters Patent, is:

1. In a kinetoscope, the combination of a main frame, a primary pull-off drum having constant rotation and journaled on said frame, a shutter having a carrying shaft journaled on said frame, a carriage mounted on said frame for vertical movement, means for effecting a vertical adjustment of said carriage, an intermittent film feeding mechanism mounted on said carriage, an operative connection between the shutter carrying shaft and the intermittent film feeding mechanism maintaining constant driving connection during the vertical movement of the carriage without rotating the shutter relative to the film feeding mechanism, and means for imposing simultaneous rotation on the primary pull-off drum and shutter, substantially as set forth.

2. In a kinetoscope, the combination of a main frame, a primary pull-off drum having constant rotation and journaled on said frame, a shutter having a carrying shaft journaled on said frame, a carriage mounted on said frame for vertical movement, means for effecting a vertical adjustment of said carriage, an intermittent film feeding mechanism mounted on said carriage, the same comprising a film feeding sprocket drum and an intermittent gearing for operating the same, an operative connection between the shutter carrying shaft and the intermittent film feeding mechanism maintaining constant driving connection during the vertical movement of the carriage without rotating the shutter relative to the film feeding mechanism, and means for imposing simultaneous rotation on the primary pull-off drum and shutter, substantially as set forth.

3. In a kinetoscope, the combination of a main frame, a primary pull-off drum having constant rotation and journaled on said frame, a shutter having a carrying shaft journaled on said frame, a carriage mounted on said frame for vertical movement, means for effecting a vertical adjustment of said carriage, an intermittent film feeding mechanism mounted on said carriage, an operative connection between the shutter carrying shaft and the intermittent film feeding mechanism maintaining constant driving connection during the vertical movement of the carriage without rotating the shutter relative to the film feeding mechanism, the same comprising a shaft in angular relation to the shutter carrying shaft and operatively geared therewith and a pair of meshed bevel gears mounted on the carriage, one of said gears having rotation and sliding engagement with said shaft in angular relation, and the other of said gears having operative connection with a shaft of the film feeding mechanism, and means for imposing simultaneous rotation on the primary pull-off drum and shutter, substantially as set forth.

4. In a kinetoscope, the combination of a main frame, a primary pull-off drum having constant rotation and journaled on said frame, a shutter having a carrying shaft journaled on said frame, a carriage mounted on said frame for vertical movement, means for effecting a vertical adjustment of said carriage, an intermittent film feeding mechanism mounted on said carriage, an operative connection between the shutter carrying shaft and the intermittent film feeding mechanism maintaining constant driving connection during the vertical movement of the carriage without rotating the shutter relative to the film feeding mechanism, the same comprising a shaft in angular relation to the shutter carrying shaft and operatively geared therewith and a pair of meshed bevel gears mounted on the carriage, one of said gears having rotation and sliding engagement with said shaft in angular relation, and the other of said gears having operative connection with a shaft of the film feeding mechanism, and means for imposing simultaneous rotation on the primary pull-off drum and shutter, the same comprising a vertical shaft in angular relation to the shutter shaft and operatively connected therewith and a pair of meshed bevel gears mounted on the main frame, one of said gears being attached to said shaft in angular relation, and the other of said gears to the shaft of the pull-off drum, substantially as set forth.

Signed at Chicago, Illinois, this 11th day of August 1906.

ALVAH C. ROEBUCK.

Witnesses:
 ROBERT BURNS,
 HENRY MOE.